United States Patent [19]
Cartwright

[11] 3,968,531
[45] July 13, 1976

[54] MOLDED PLASTIC BEEHIVE

[76] Inventor: Patrick E. Cartwright, R.R. No. 1, Seymour, Ind. 47274

[22] Filed: Dec. 18, 1974

[21] Appl. No.: 533,929

[52] U.S. Cl. .................................................. 6/1
[51] Int. Cl.² ........................................ A01K 47/00
[58] Field of Search ............ 6/1, 2 R, 2 A, 10, 11, 6/8; 29/451, 453; 46/31; 220/DIG. 15, 4 F; 217/65, 12, 13, 45

[56] References Cited
UNITED STATES PATENTS

| | | | |
|---|---|---|---|
| 2,099,655 | 11/1937 | MacFadden | 29/453 |
| 2,358,160 | 9/1944 | Haack | 6/8 |
| 2,964,210 | 12/1960 | Paley | 220/DIG. 15 |
| 3,002,650 | 10/1961 | Lovell | 220/DIG. 15 |
| 3,069,002 | 12/1962 | Hart | 220/4 F |
| 3,110,044 | 11/1963 | Dullas | 6/1 |
| 3,410,441 | 11/1968 | Rhyne | 220/4 F |
| 3,528,583 | 9/1970 | Taylor | 220/4 F |
| 3,692,204 | 9/1972 | Provi et al. | 220/4 F |

FOREIGN PATENTS OR APPLICATIONS

| | | | |
|---|---|---|---|
| 2,040,242 | 2/1972 | Germany | 6/2 R |

Primary Examiner—Jack Q. Lever
Attorney, Agent, or Firm—Jenkins, Hanley & Coffey

[57] ABSTRACT

For use in a beehive, a molded plastic super having rectangularly arranged vertically extending walls including end walls and side walls. Each side wall provides, at its ends, vertically spaced apart openings while each end wall provides, at its ends, integrally molded tenons resiliently snapped into engagement with the openings in the adjacent side wall end, thereby rigidly to connect the walls. A molded plastic bottom board upon which the super rests is provided, the bottom board having a rectangularly shaped planar intermediate portion with opposing sides and ends and with an upwardly projecting outer perimetral wall extending longitudinally along the sides and one of the ends to provide an upwardly facing surface upon which the side walls and one end wall of the super rest. The bottom board also provides an inner perimetral wall extending longitudinally alongside each outer wall and projecting upwardly into the super to position the walls thereof. Locating tabs extend downwardly from the super walls to engage into recesses in the bottom board. The bottom board is constructed such that it may be used as the top cover of the hive. A molded plastic inner cover for the super is provided.

6 Claims, 5 Drawing Figures

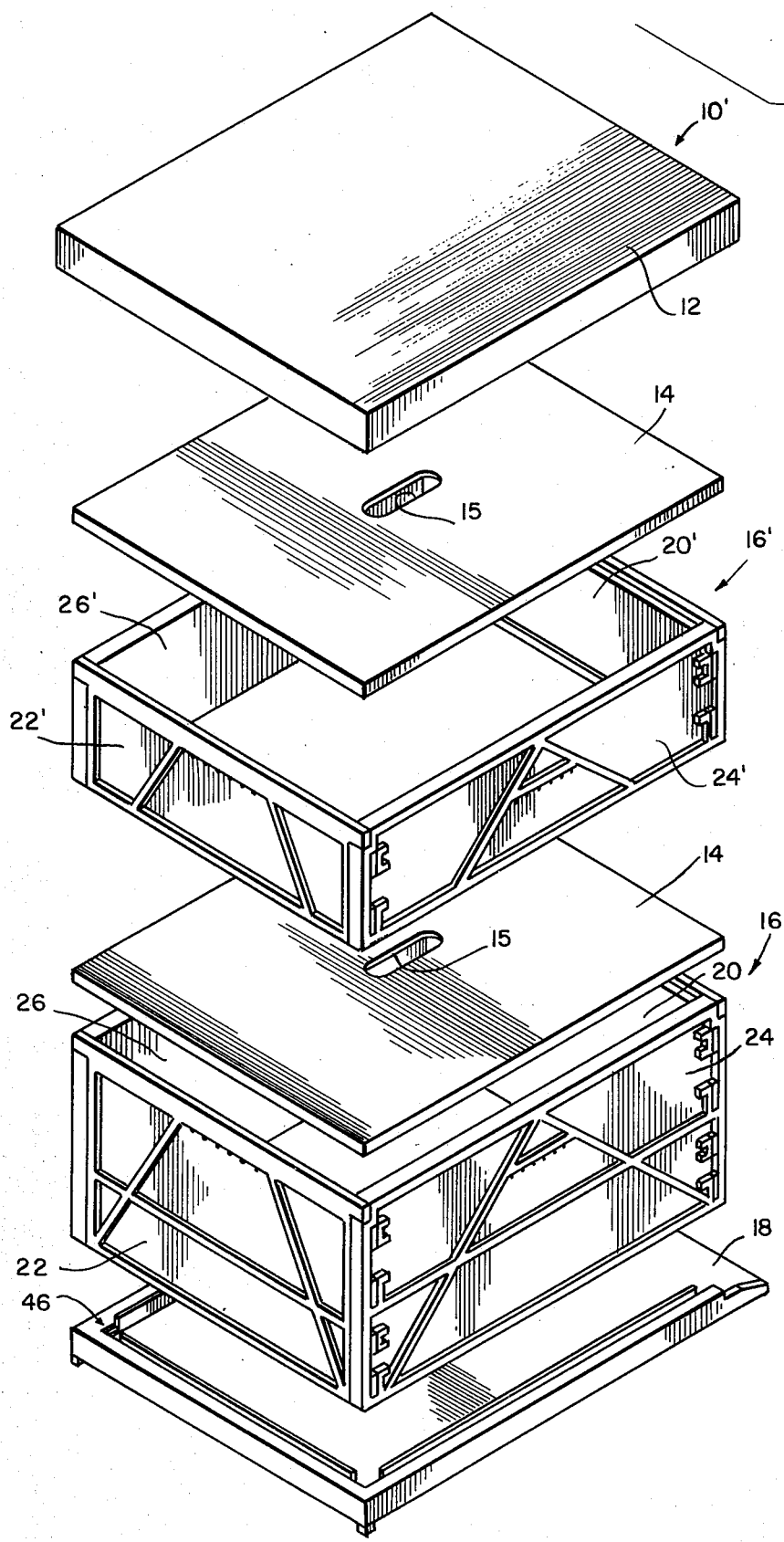

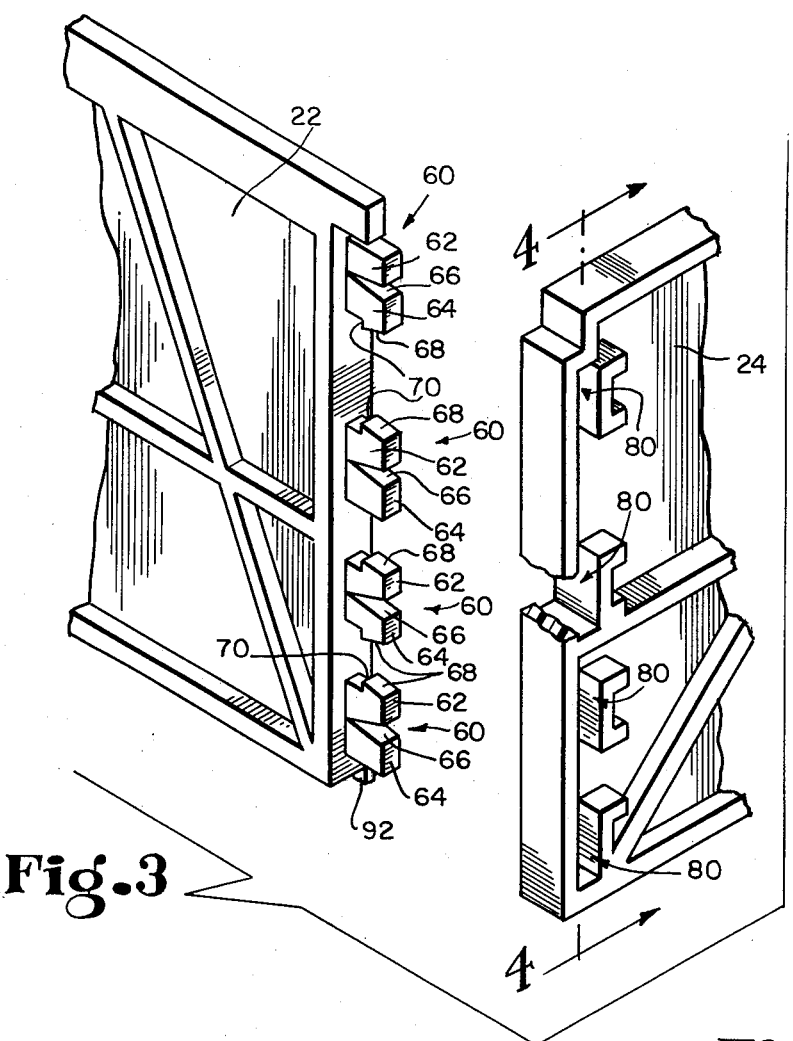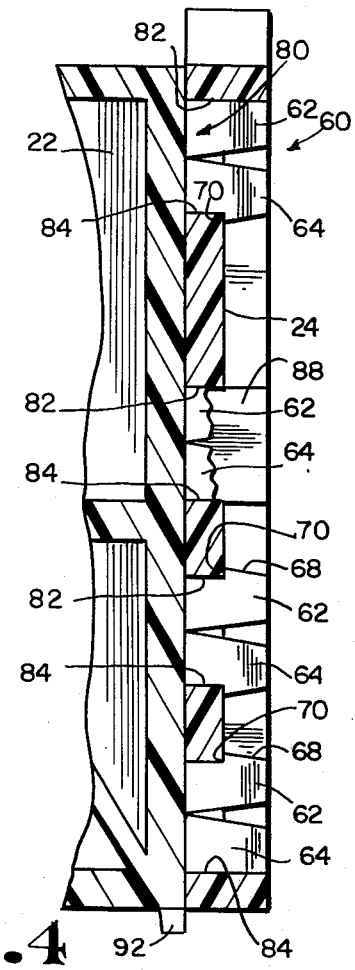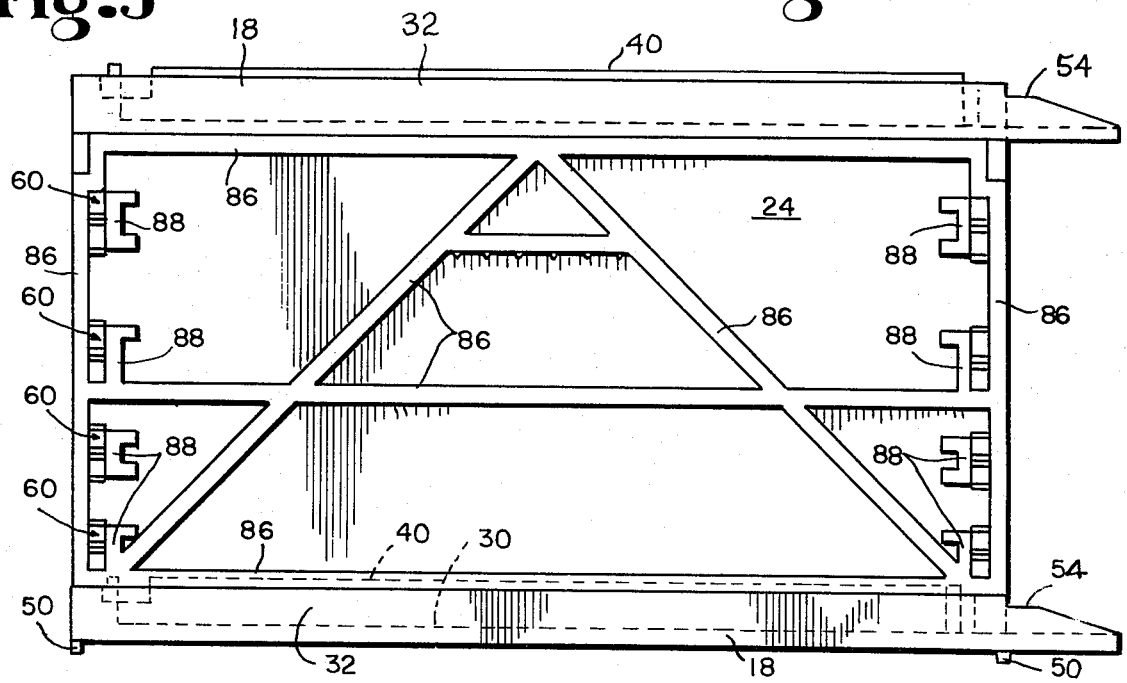

MOLDED PLASTIC BEEHIVE

The present invention relates to beehives and more particularly to the provision of a molded plastic beehive or a beehive, the basic parts of which are molded plastic.

In accordance with my invention, I provide a beehive comprising a molded plastic bottom board, a molded plastic super mounted upon the bottom board, a molded plastic inner cover for the super, and a molded plastic top cover for the hive, the so-called telescoping top cover. The super includes opposite side walls and opposite end walls snapped together to provide four corner connections, each corner connection including tenons on one wall resiliently snapped into engagement with openings in the adjacent wall.

While I have heretofore marketed molded plastic inner covers or the covers which rest directly upon the top of the super, I believe that I am the first to propose constructing the entire hive including the bottom board, super walls, and top cover from my molded plastic material, and particularly the first one to construct such a hive having the interconnection features disclosed and claimed herein.

It is a primary object of my invention to provide, for use in a beehive, a molded plastic super having a first pair of opposing vertically extending walls and a second pair of opposing vertically extending walls, each wall of the first pair providing, at its ends, vertically spaced apart openings, each wall of the second pair providing, at its ends, integrally molded tenons resiliently snapped into engagement with the openings in the adjacent end of the wall of the first pair, thereby rigidly to connect the walls.

Another object of my invention is to provide such a super in which each of the tenon openings is a vertically elongated rectangular opening, each tenon including a pair of vertically spaced apart lugs projecting outwardly to penetrate through the adjacent opening, the lugs being resiliently movable toward each other. At least one of the lugs is formed with a vertically inclined camming surface which cams the lugs together as they are penetrated into their associated opening, the camming surface terminating with a hook which moves vertically as the camming surface passes through the opening to engage the adjacent wall.

I prefer to mold the beehive from a polyethylene or polypropylene using the conventional and commercially available structural foam method. This particular method lends itself to beehives since it has tremendous strength and since it is a good thermal insulator against heat and cold.

My molded plastic beehive has many advantages over conventional wooden beehives. It can be very easily cleaned and disinfected. The cleaning is made easier because it quickly disassembles from its very tight, rigid structure to individual parts which are easy to clean using almost any detergents or disinfectants.

Importantly, my beehive will not rot and it can be placed directly upon the ground without any foundation thereunder designed to prevent rotting. It can be molded from white material and does not need to be painted.

Other objects and features of my molded plastic beehive will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 2 is an exploded perspective view of my molded plastic beehive including a deep super and a shallow super;

FIG. 3 is a fragmentary perspective view showing how the walls of my super are interlocked together;

FIG. 4 is a fragmentary and enlarged sectional view taken from FIG. 3 generally along the line 4—4; and FIG. 5 is an elevational view of a hive showing my molded plastic bottom board also used as a top.

Figure 1:
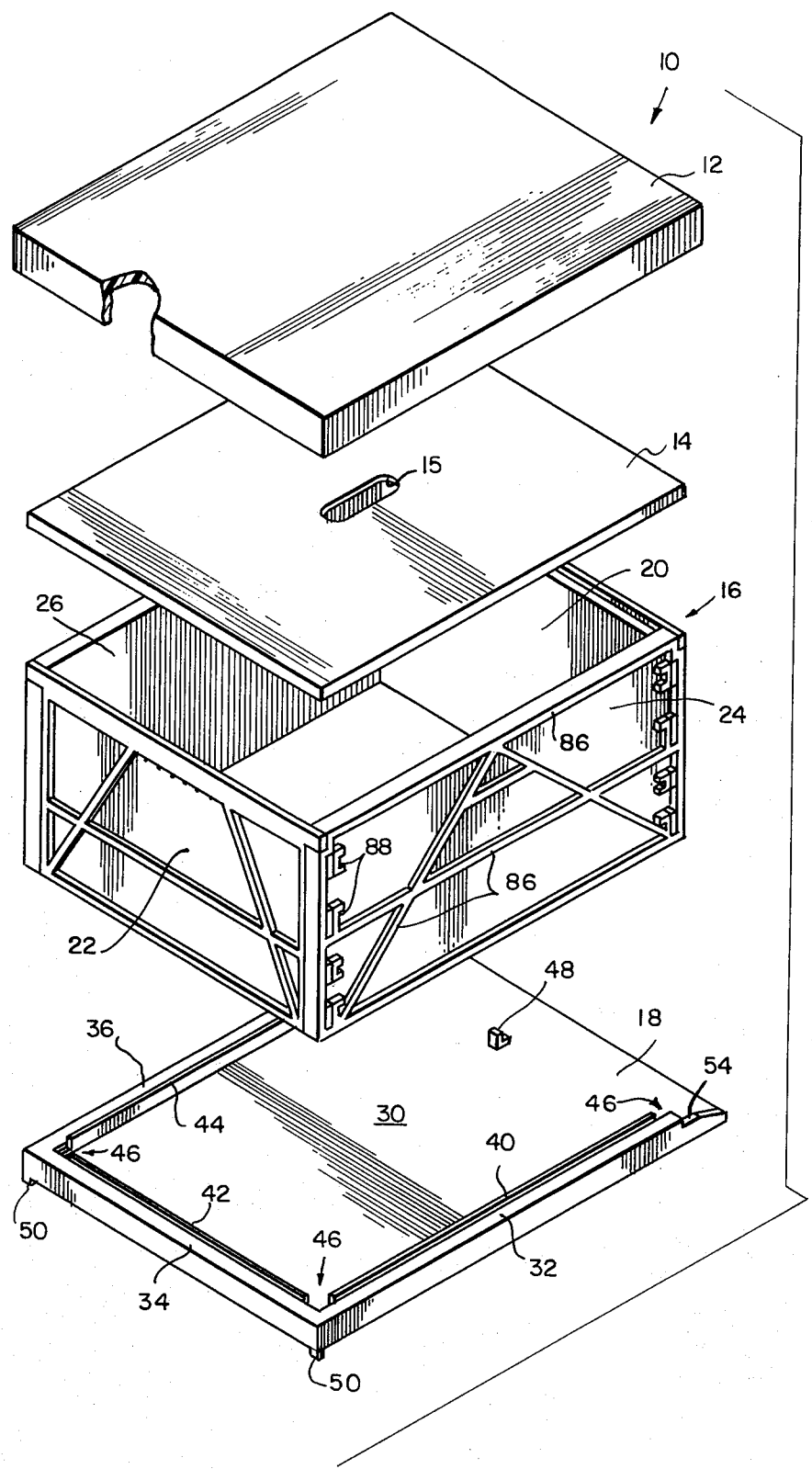
FIG. 1 is an exploded perspective view of my molded plastic beehive.

Referring now particularly to the drawings, it will be seen that my hive is indicated generally by the reference numeral 10 and comprises a top cover 12, an inner cover 14 having the conventional center opening 15 therein, a super 16, and a bottom board 18. Each of these basic parts of my hive 10 is molded plastic and preferably it is structural foam molded polyethylene or polypropylene.

The super 16 has opposite end walls 20, 22 and opposite side walls 24, 26, the manner in which the end walls and side walls are interconnected being discussed in detail hereinafter.

The molded plastic bottom board 18 has a generally flat and relatively thin intermediate rectangularly shaped planar portion 30 with a rectangular outer perimetral wall 32, 34, 36 extending along and projecting upwardly from each side edge and the one end edge. An inner perimetral wall 40, 42, 44 extends along each wall 32, 34, 36 and projects upwardly thereabove to extend into the super 16 to position the super. The side walls 24, 26 rest upon the upwardly facing surfaces of the walls 32, 36 and the end wall 22 of the super rests upon the end wall 34. In addition, a recess 46 is provided at each corner of the bottom board and particularly at each end of each perimetral wall 40, 42, 44 to receive downwardly extending locating tabs provided on the super as will be discussed hereinafter. In the center of the front end of the bottom board 18, an upwardly extending post 48 is provided for engaging the bottom edge of the end wall 20 of the super. This post 48 serves to keep the plastic bottom board from warping upwardly and closing against the bottom edge of the end wall 20.

Further, the bottom board 18 is provided with downwardly extending cleats 50 on each of its four corners which engage the ground and which also secure the bottom board to the upper edges of the super when it is used as a cover as illustrated in FIG. 5. Finally, notches 54 are provided on each side of the front end of the bottom board 18 for stacking purposes.

Turning now to FIGS. 3–5, the manner in which the walls of the super are releasably but very securely connected together will be discussed. The tenons are indicated generally by the reference numeral 60, each illustrative tenon including an upper lug 62 and a lower lug 64 with a shallow V-shaped opening therebetween. The lugs are integrally molded on the end walls 20, 22 of the super and are resilient such that the lugs can move together when vertical pressure is applied to one or both of the lugs. Either the upper lug or the lower lug or both is provided with a camming surface 68 which inclines vertically upwardly from the distal end of the lug to a point at which it terminates in a hook as indicated at 70.

Each end of each side wall 24, 26 is provided with a rectangularly shaped, vertically elongated opening 80 for each adjacent tenon 60 with the upper edge of each opening being indicated at 82 and the lower edge of each opening being indicated at 84. The lateral width or horizontal width of each opening 80 is preferably substantially equal to the horizontal width of the tenons 60 such that the openings will be closed by the tenons. As viewed in FIG. 4, when the tenons 60 are moved to the right relative to the wall 24, each tenon compresses vertically because of the cam surface thereon until the cam surface passes entirely through the opening to move vertically either downwardly or upwardly as the case may be to engage the hook 70 with the right-hand surface of the side wall. Of course, the walls can be disassembled by closing together the lugs of each tenon so that they can pass back through the opening 80.

I show a plurality of strengthening ribs 86 extending about the perimeter of each side wall and end wall and it can be seen that I have used such ribs 86 in a sort of an A-frame design. I also use strengthening ribs 88 adjacent each opening 80 to provide lateral bearing surfaces for the tenons 60.

After the side walls are interconnected by the tenon arrangement just described, the downwardly extending locating tabs 92 on each end of each super wall (side wall and end wall) engage into the recesses 46 securely to position the super on the bottom board 18.

Turning now to FIG. 2, it will be seen that I have shown a shallow super 16' with end walls 20', 22' and side walls 24', 26' mounted above the deep super 16 with an additional inner cover 14 therebetween. I can mount as many supers, shallow or deep, on a bottom board 18 as required under the circumstances.

I claim:

1. A beehive comprising a molded plastic bottom board, a molded plastic super mounted upon said bottom board, a molded plastic inner cover for said super, and a molded plastic top cover for said hive, said top cover being substantially identical to said bottom board, said super including opposite side walls and opposite end walls snapped together to provide four corner connections, each corner connection including tenons on one wall resiliently snapped into engagement with openings in the adjacent wall, each said opening being a vertically elongated rectangular opening, each said tenon including a pair of vertically spaced apart lugs projecting outwardly from said one wall to penetrate through the adjacent opening, said lugs being resiliently movable toward each other, at least one of said lugs being formed with a vertically inclined camming surface which engages said opening as said lugs are penetrated into said opening to move said one lug vertically toward the other lug, said camming surface terminating with a hook which moves vertically as said camming surface passes through said opening to engage said adjacent wall.

2. For use in a beehive, a molded plastic super having a first pair of opposing vertically extending walls and a second pair of opposing vertically extending walls, each wall of said first pair providing, at its ends, vertically spaced apart openings, each wall of said second pair providing, at its ends, integrally molded tenons resiliently snapped into engagement with said openings in the adjacent end of the wall of said first pair, thereby rigidly to connect said walls.

3. The invention of claim 2 in which each said opening is a vertically elongated rectangular opening, each said tenon including a pair of vertically spaced apart lugs projecting outwardly to penetrate through the adjacent opening, said lugs being resiliently movable toward each other, at least one of said lugs being formed with a vertically inclined camming surface which cams said lugs together as they are penetrated into said opening, said camming surface terminating with a hook which moves vertically as said camming surface passes through said opening to engage the adjacent wall.

4. The invention of claim 2 including a molded plastic bottom board upon which said super rests, said bottom board having a rectangularly shaped planar portion with opposing sides and ends and with an upwardly projecting outer perimetral wall extending longitudinally along said sides and one of said ends to provide an upwardly facing surface upon which the side walls and one end wall of said super rest, said bottom board also providing an inner perimetral wall extending longitudinally alongside each outer wall and projecting upwardly into said super to position the walls thereof.

5. The invention of claim 4 in which each corner of said bottom board is provided with an upwardly opening recess and each end of each wall is provided with a downwardly projecting locating tab received in one of said recesses.

6. A beehive comprising a molded plastic super having a first pair of opposing vertically extending walls and a second pair of opposing vertically extending walls, each wall of said first pair providing, at its ends, vertically spaced apart openings, each wall of said second pair providing, at its ends, integrally molded tenons resiliently snapped into engagement with said openings in the adjacent end of the wall of said first pair, thereby rigidly to connect said walls, a molded plastic bottom board upon which said super rests, said bottom board having a rectangularly shaped planar portion with opposing sides and ends and with an upwardly projecting outer perimetral wall extending longitudinally along said sides and one of said ends to provide an upwardly facing surface upon which the side walls and one end wall of said super rest, the end of said bottom board opposite to said one end being provided with an upwardly extending post engaging the super wall thereabove, said bottom board also providing an inner perimetral wall extending longitudinally alongside each outer wall and projecting upwardly into said super to position the walls thereof.

* * * * *